(No Model.)

H. S. HILL.
BRIDLE.

No. 505,658. Patented Sept. 26, 1893.

WITNESSES:
John A. Rennie
C. Sedgwick

INVENTOR
H. S. Hill
BY
Munn & Co.
ATTORNEYS.

UNITED STATES PATENT OFFICE.

HARVEY S. HILL, OF ITHACA, MICHIGAN.

BRIDLE.

SPECIFICATION forming part of Letters Patent No. 505,658, dated September 26, 1893.

Application filed May 3, 1893. Serial No. 472,889. (No model.)

*To all whom it may concern:*

Be it known that I, HARVEY S. HILL, of Ithaca, in the county of Gratiot and State of Michigan, have invented a new and Improved Horse-Taming Bridle, of which the following is a full, clear, and exact description.

My invention relates to improvements in harness and harness attachments; and the object of my invention is to produce an apparatus substantially like a bridle, which is very cheap and simple, which may be easily applied to the head of a horse, which may if desired be worn beneath an ordinary bridle without attracting attention, which is constructed so that by it a noose may be formed and carried around the upper jaw of the horse between the lip and the teeth, which has means for tightening the noose so as to bring the horse under perfect control, which is adapted to connect with and be operated by the ordinary driving reins, which does not injure the horse, and which is adapted to render a vicious horse kind, a runaway safe, a balky horse tractable and to prevent a kicker from kicking.

To these ends my invention consists in certain features of construction and combinations of parts, as will be hereinafter described and claimed.

Reference is to be had to the accompanying drawings forming a part of this specification, in which similar figures of reference indicate corresponding parts in both the views.

Figure 1:
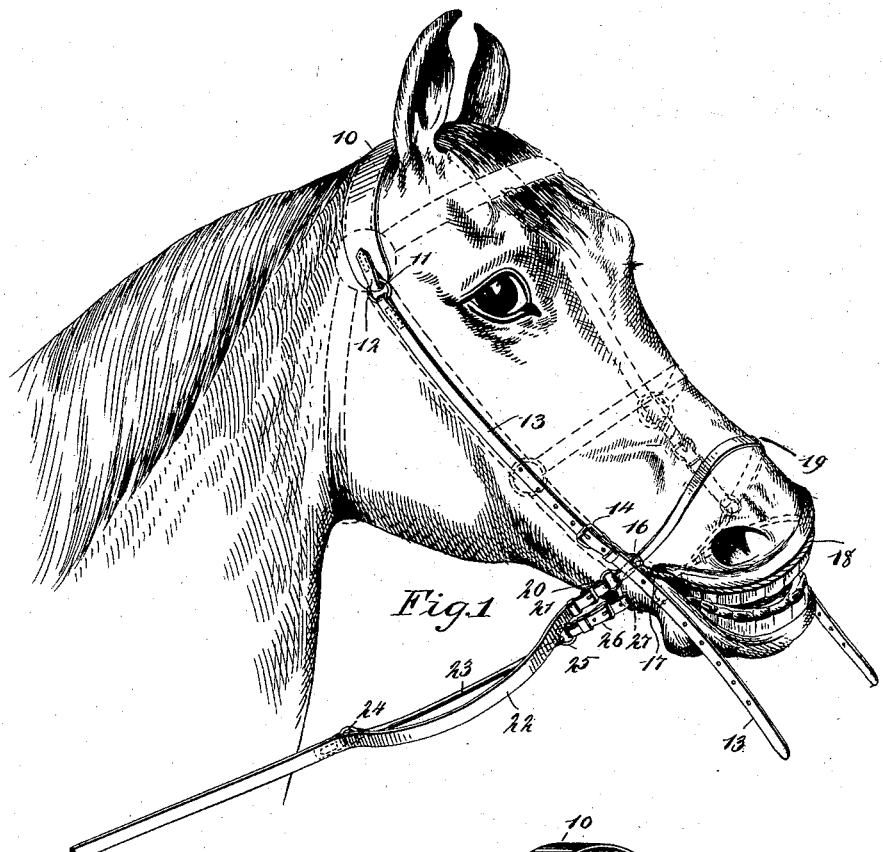
Figure 2:
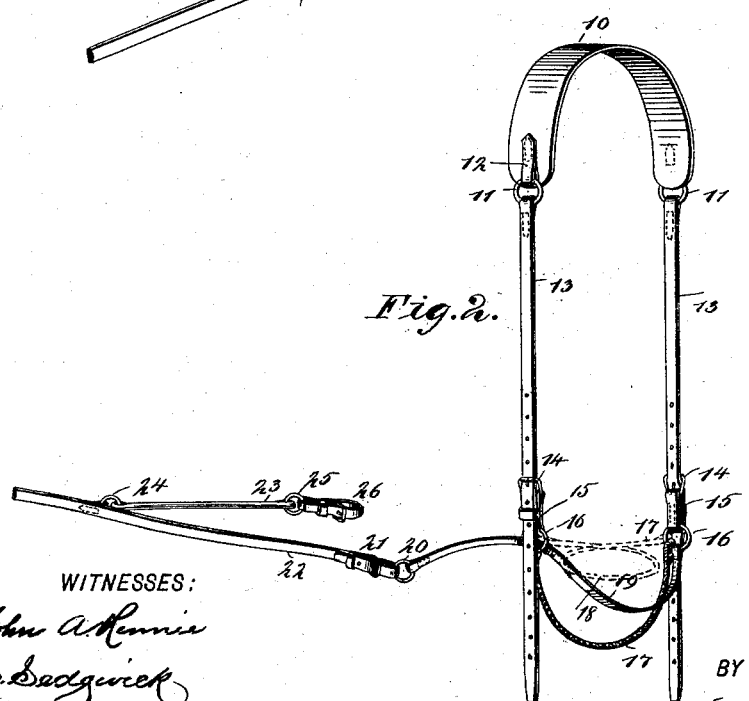

Figure 1 is a perspective view of my improved taming bridle as applied to the head of a horse; and Fig. 2 is a detail perspective view of the bridle.

The bridle is provided with a head piece 10 which is adapted to rest upon the head of the horse behind the ears and is made broad enough to be easy. At the ends of the head piece are rings 11 which are secured to the head piece, preferably by means of loops 12, and secured to the rings 11 are the straps or cheek pieces 13 which are adapted to extend along the cheeks of the horse and which are perforated in the usual way so as to permit the adjustment of the buckles 14, which buckles are secured to the cheek pieces and are provided with straps 15 carrying rings 16 to which is secured a cord 17, this being adapted to extend through the mouth of the horse substantially like a bit, but the cord is sufficiently long to permit it to be crossed and formed into a loop or noose 18 which is adapted to encircle the upper jaw above the teeth and between the teeth and the upper lip, as shown clearly in Fig. 1.

To one of the rings 16 is secured a strap 19, which is adapted to extend over the nose of the horse, as shown in Fig. 1, and it runs loosely through the opposite ring 16 and terminates in a ring 20 which is buckled, as shown at 21, to a strap or rein 22, and if the strap 22 is the usual driving rein, it is provided with an elastic branch 23 which is secured to the main rein or strap by a ring 24 and which, at its free end, is provided with a ring 25 and strap 26, the latter being adapted to buckle into the ordinary bridle bit ring, as shown in dotted lines at 27 in Fig. 1.

The bridle may be applied to the head of a horse in the usual way, and the cheek pieces may be adjusted so as to make it fit a head of any size. When it is applied the cord 17 is formed into the loop or noose 18, which is placed around the upper jaw and in the mouth, as described, with the cord between the teeth and upper lip, while the nose strap 19 is passed around the nose and secured to the strap or rein 22. If the horse attempts to break away, to kick, or to act bad in any way, the strap 22 is pulled upon, and this tightens the nose strap 19 and pulls on one of the rings 16 so as to tighten the noose 18 around the jaw of the horse, and this hurts the animal and attracts his attention so as to render him easily manageable. If the bridle is worn beneath a common bridle it may be connected with the rein 22, as described, and the elastic branch 23 connected with the bridle bit. When the horse drives easily and without pulling excessively on the reins, the elastic branch will serve to guide and restrain him; but if he becomes vicious or pulls hard, sufficient pressure is put upon the rein 22 to cause the elastic branch to stretch and thus permit the rein to pull upon the rein strap and bring my improved attachments into play, after which the horse is easily managed.

In the foregoing description I have described an elastic band 23 which may be of rubber or suitable material, but it will be understood that a spring may be substituted for the band if desired, without affecting the principle of the invention.

Having thus described my invention, I claim as new and desire to secure by Letters Patent—

1. A bridle having cheek straps connected near the lower ends by a cord forming connection between the cheek straps and being of a length to form a loop and fixedly held by its ends to said cheek pieces, the latter having rein receiving rings, and a pull on such rings serving to exert tension on the cord, substantially as described.

2. A bridle having cheek pieces provided with rein-receiving rings, a cord fixedly held by its ends to the said rings, and a nose band fixedly held to one of said rings and loosely passing through the other and adapted at its free end for connection with a rein, a pull on the cheek pieces serving to exert tension on the cord, substantially as described.

HARVEY S. HILL.

Witnesses:
WM. M. BARSTOW,
JAMES G. KRESS.